US005300344A

United States Patent [19]

Niedecker

[11] Patent Number: 5,300,344

[45] Date of Patent: Apr. 5, 1994

[54] TAG STRIP WITH PERFORATIONS AND STAPLE ENGAGING MEANS

[76] Inventor: Herbert Niedecker, Am Ellerhang 6, 6240 Königstein 2, Fed. Rep. of Germany

[21] Appl. No.: 720,486

[22] PCT Filed: Dec. 21, 1989

[86] PCT No.: PCT/DE89/00782

§ 371 Date: Jun. 21, 1991

§ 102(e) Date: Jun. 21, 1991

[87] PCT Pub. No.: WO90/07726

PCT Pub. Date: Jul. 12, 1990

[30] Foreign Application Priority Data

Dec. 28, 1988 [DE] Fed. Rep. of Germany ....... 3844051

Aug. 5, 1989 [DE] Fed. Rep. of Germany ....... 3925980

[51] Int. Cl.[5] .......................... G09F 3/14; B32B 3/24

[52] U.S. Cl. .................................. 428/131; 428/189; 428/81; 428/137; 428/43; 428/192; 283/81; 40/299; 40/669

[58] Field of Search ................. 428/189, 81, 131, 137, 428/43, 192; 283/81; 40/299, 669

[56] References Cited

U.S. PATENT DOCUMENTS 4,176,479 12/1979 l'Hoir .................................. 428/43
4,289,561 9/1981 Holzknecht .......................... 40/299
4,320,158 3/1982 Seeley .................................. 40/299
4,393,107 7/1983 Jenkins ................................. 40/299
4,533,586 8/1985 Roule et al. ......................... 428/137
4,715,135 12/1987 Fast ...................................... 40/299
4,791,742 12/1988 Stover ................................... 40/299
4,972,616 11/1990 Doll ...................................... 40/299
5,104,148 4/1992 Neal ...................................... 283/81

FOREIGN PATENT DOCUMENTS 2109665 9/1972 Fed. Rep. of Germany .
1428084 3/1976 United Kingdom .

*Primary Examiner*—Ellis P. Robinson
*Assistant Examiner*—William P. Watkins
*Attorney, Agent, or Firm*—Sprung Horn Kramer & Woods

[57] ABSTRACT

In the packaging of foodstuffs in flexible tubular sheaths made of plastic, natural guts or netting and closed by closing staples by means of closing machines, it is often desired to include in the closing staple a tag, which bears the inscription required for the package. Besides, such a tag is required to be able to be provided with a sufficient inscription and should have a portion which can be gripped by the closing staple. For that purpose a tag strip 1 is provided, which for its feeding is centrally provided with a continuous perforation line in the feeding direction and which between the tags 5 has a sufficiently long portion 4 which is narrower to such an extent that said portion when it has been severed from the preceding tag can be engaged and embraced by the closing staple 7.

4 Claims, 2 Drawing Sheets

TAG STRIP WITH PERFORATIONS AND STAPLE ENGAGING MEANS

BACKGROUND OF THE INVENTION

When foodstuffs are packaged in tubular packaging sheaths which consist of plastic, natural intestine or netting and are closed by closing clips applied by closing machines, it is often desired to insert into the closing clip a tag which is provided with the inscription required on the packaging sheath. In some countries there are even regulations prescribing such tags to be provided with a large amount of information concerning the contents, weight, price per unit, total price and expiration date. The required information should easily be legible and clearly arranged on the tag and the tag must permit the inscription to be applied, mostly printed, before or after the sheath is closed, e.g., in automatic weighing plants. For this reason a sufficient size, particularly a sufficient width, is required. Besides, such tags must have a portion which can readily be received by the closing clip and can be gripped as the packaging sheath is closed.

SUMMARY OF THE INVENTION

It is an object of the invention to provide a tag strip which serves to insert individual tags into respective closing clips for tubular packaging sheaths before the latter are closed and which comprises tags which meet the requirements set forth hereinbefore.

DETAILED DESCRIPTION OF THE INVENTION

Figure 1:
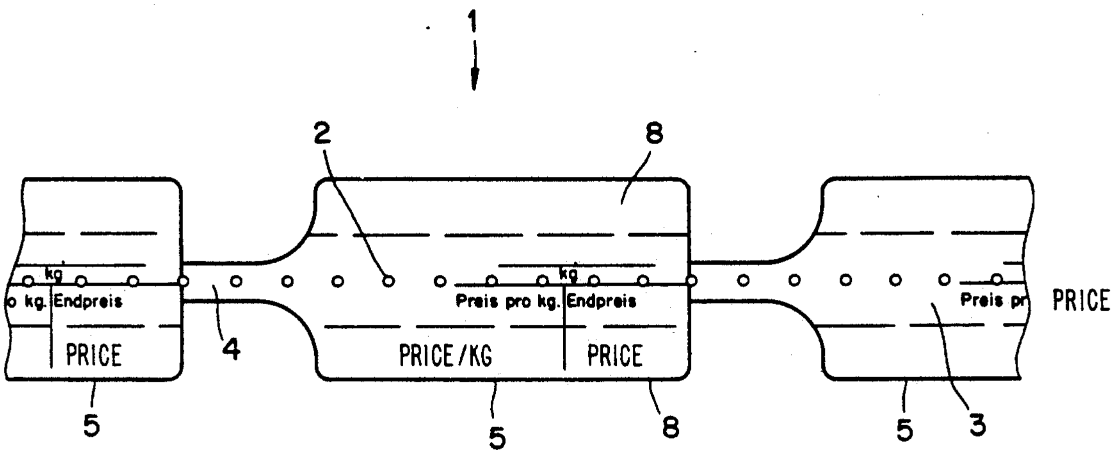
FIG. 1 is a plane view of a first embodiment of a tag strip according to the invention.

In a tag strip according to the prior art part of the main claim that object is accomplished in that the tag strip is provided with a continuous perforation line in the feeding direction so that the strip can be fed in a tag applying machine and that the perforation line extends also in the narrower fixing portion.

Whereas a large number of tag strips for an adhering of individual tags are known, inclusive of tag strips having a narrower portion (FR-A-2 248 762), such tag strips do not have a continuous perforation line for the feeding of the strips. Other tag strips, which have a perforation line for use in a tag-applying machine (DE-A-2109665) do not have a continuous perforation line for use in feeding the strip. Tags which are perforated for being fed are not provided with a special portion which can be inserted into a closing clip for tubular packaging sheaths. Whereas so-called code lugs for insertion into closing clips are known, they are relatively narrow and for this reason cannot be provided with the above-mentioned information which is desired and they are so narrow that they cannot be provided with perforations, particularly because such perforations would further reduce the areas which are available for inscriptions.

In the tag strip in accordance with the invention the continuous perforation line may be provided approximately at the center of the width of the strip so that the free area which is provided on the tag for receiving inscriptions will be approximately symmetrically arranged on both sides of the continuous perforation line. Such tags are particularly suitable for being printed before the packaging sleeves are closed.

But if printing is to be performed after the closing operation because the weight of each filled package, e.g., of a turkey, is to be stated on the tag, a wide tag which is provided with a continuous perforation line approximately at the center of its width will not always be desirable or required, particularly if the tag is printed as it is pulled through. In that case it will be desirable to provide the free area that is to be printed only on one side of the continuous perforation line because this will facilitate the handling and will save material.

The tag strip in accordance with the invention may be made of paper or of a printable plastic. If the strip consists of a relatively thin paper, which is suitable for the intended use, it will be necessary to reinforce the tag strip on its underside by a stiffening strip which is firmly joined to the tag strip proper and which is perforated just as the tag strip. That stiffening will be required for a more reliable insertion of the tag strip into the closing clip which is ready to receive the strip. Resides, this will prevent a tearing of the tag strip as it is wound up and unwound and as it is fed, particularly when it is subjected to a high tension. Particularly the narrower portion will be particularly endangered because the strip is relatively small in cross-section here. The reinforcement will also more reliably ensure that the tag cannot be torn off too easily when it has been applied to the packaging sheath. The risk of such tearing will be particularly high during handling under moist or wet conditions, e.g., in the foodstuffs industry. That stiffening stip is usually required to have such a width that it covers the Perforation line and the narrower portion. The stiffening strip is usually attached to the underside of the tag strip before the tags are given their final shape, i.e., before the narrower portion and the perforation line are formed. The stiffening strip may initially be wider than the subsequently formed narrower portion so that the narrower portion will be stiffened as highly as possible after it has been formed.

Figure 2:
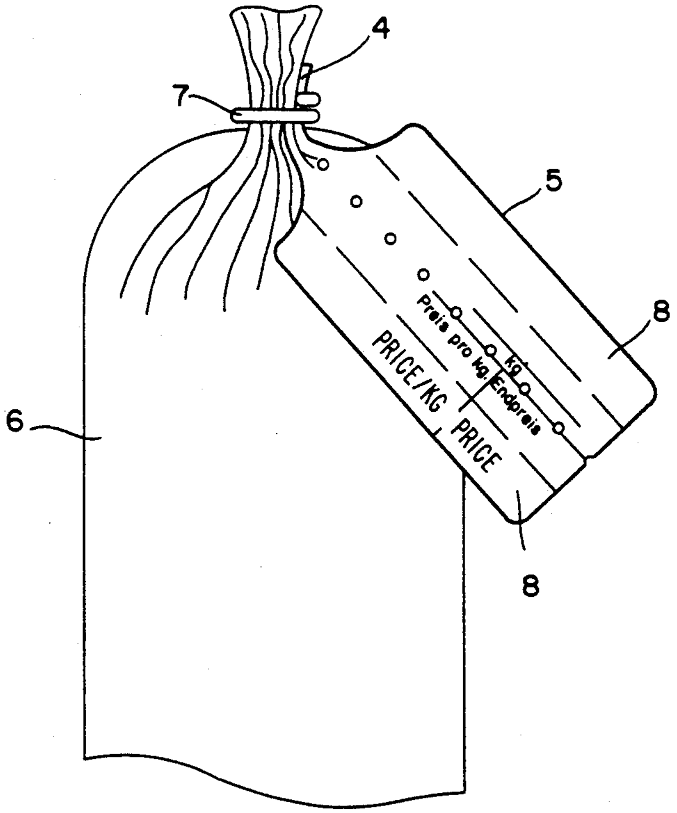
FIG. 2 shows a tag of the first embodiment clamped to a packing sheath.

The invention will be explained with reference to the drawings:

FIG. 1 shows a tag strip 1 which is provided approximately at the center of its width with a continuous perforation line 2 and has free areas 8, which are symmetrically arranged on both sides of the perforation line 2. A stiffener 3 consisting of an adhesive tape and indicated by a broken line is attached adjacent to the perforation line. The narrower portion 4 of each tag 5 is intended to be clamped in a closing clip 7 provided on a packaging sheath 6 (see FIG. 2). FIG. 2 shows the tag 5 having a narrower portion 4 which is clamped by a closing clip 7 to a sausagelike packaging sheath 6.

Figure 3:
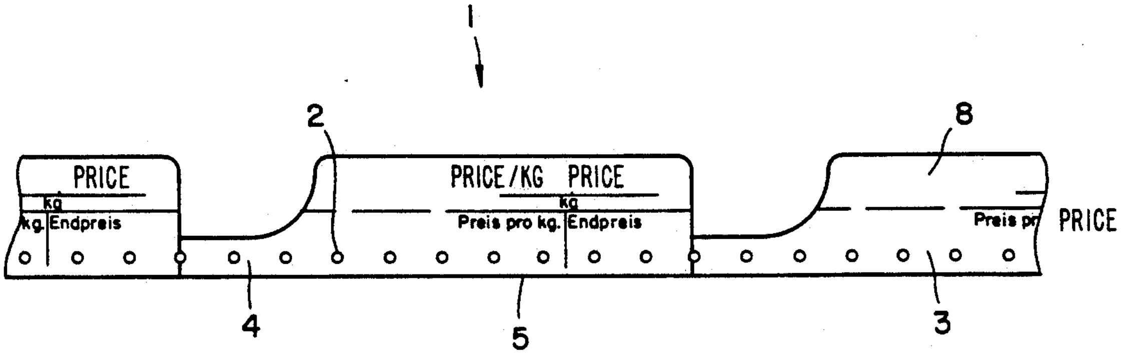
FIG. 3 is a plane view of a second embodiment of the tag strip according to the invention.
Figure 4:
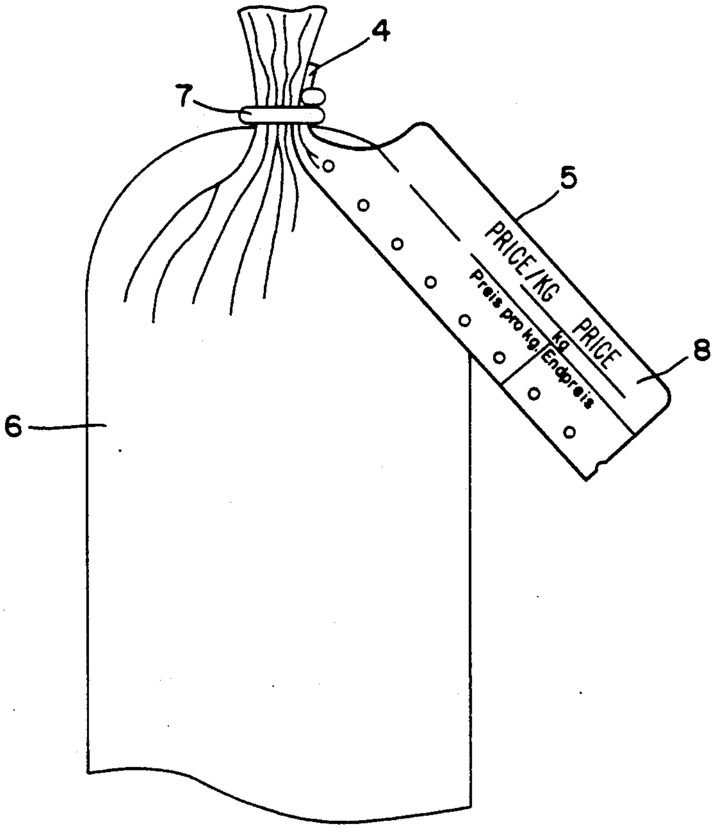
FIG. 4 shows a tag of the second embodiment clamped to a packing sheath.

FIG. 3 shows the tag strip 1 provided with the continuous perforation line 2 and the continuous stiffener 3, which extends under the narrower portion 4. The free area 8 of the tag 5 extends only on one side of the continuous perforation line 2. Where that embodiment is used the package may be closed and weighed and the tag 5 can then manually be pulled through a marking device, which in dependence on the weight determines the unit price and applies that price to the tag. FIG. 4 shows that tag strip on a closed package.

What is claimed is:

1. A strip of connected tag portions from which individual tags can be severed, the strip including a line of substantially equi-spaced perforations, each tag portion having a body and a narrowed neck by which it is connected to the body of the next tag, the perforations extending through the body and the narrowed neck of the tags successively.

2. A tag strip according to claim 1, wherein the body of each tag portion has two areas laterally extending approximately the same distance relative to the perforation line.

3. A tag strip according to claim 1, wherein the body of each tap portion has only one area extending laterally of the perforation line.

4. A tag strip according to claim 1, on its underside carrying a continuous stiffening strip provided with perforations aligned with those of the tag portions.

* * * * *

UNITED STATES PATENT AND TRADEMARK OFFICE
CERTIFICATE OF CORRECTION

PATENT NO : 5,300,344

DATED : April 5, 1994

INVENTOR(S) : Herbert NIEDECKER

It is certified that error appears in the above-identified patent and that said Letters Patent are hereby corrected as shown below:

Column 4, line 6, cancel "tap" and substitute --tag--.

Signed and Sealed this

Twenty-first Day of September, 1999

Attest:

Q. TODD DICKINSON

*Attesting Officer* *Acting Commissioner of Patents and Trademarks*